US012787943B2

(12) United States Patent
Clinton

(10) Patent No.: US 12,787,943 B2

(45) Date of Patent: Nov. 10, 2026

(54) WEED CLIPPING DEVICE

(71) Applicant: Thomas Clinton, Los Angeles, CA (US)

(72) Inventor: Thomas Clinton, Los Angeles, CA (US)

( * ) Notice: Subject to any disclaimer, the term of this patent is extended or adjusted under 35 U.S.C. 154(b) by 403 days.

(21) Appl. No.: 18/386,667

(22) Filed: Nov. 3, 2023

(65) Prior Publication Data

US 2025/0143227 A1 May 8, 2025

(51) Int. Cl.
*A01G 3/06* (2006.01)

(52) U.S. Cl.
CPC .................................... *A01G 3/065* (2013.01)

(58) Field of Classification Search
CPC A01G 3/065; A01D 1/06; A01D 1/14; A01M 21/02
See application file for complete search history.

(56) References Cited

U.S. PATENT DOCUMENTS

| | | | | |
|---|---|---|---|---|
| 912,408 | A * | 2/1909 | Place | A01G 3/065 30/248 |
| 1,032,485 | A * | 7/1912 | Karcher | A01G 3/065 30/211 |
| 2,610,886 | A | 9/1952 | Parker | |
| 2,748,554 | A * | 6/1956 | Wallace | A01G 3/065 56/241 |
| 2,770,483 | A | 11/1956 | Patnaude | |
| 3,406,722 | A * | 10/1968 | Ruth | F16L 55/053 138/30 |
| 3,918,757 | A | 11/1975 | Huber | |
| D263,548 | S | 3/1982 | Rodgers | |
| 4,547,010 | A | 10/1985 | Camp | |
| 4,779,913 | A | 10/1988 | Henry | |
| 5,315,762 | A * | 5/1994 | Dearman | A01G 3/065 30/249 |
| 5,375,401 | A * | 12/1994 | Flickinger | A01D 11/06 7/114 |
| 5,535,833 | A | 7/1996 | Mathews | |
| 7,131,677 | B2 | 11/2006 | Ota | |
| 7,540,093 | B1 * | 6/2009 | Yeh | A01G 3/065 30/296.1 |
| 2005/0016149 | A1 * | 1/2005 | Wu | A01G 3/065 56/241 |

FOREIGN PATENT DOCUMENTS

GB 191307666 2/1914

OTHER PUBLICATIONS

JP 2984979 with translation (Year: 1999).*

* cited by examiner

*Primary Examiner* — Michael Mccullough

(57) ABSTRACT

A weed clipping device for removing weeds at the base of the plant while standing includes a shaft having a handle end, a blades end, and a peripheral wall defining an interior space. A rod is rotatably coupled to the shaft within the interior space. The rod has a top portion, a bottom portion, and a middle portion. The top portion is positioned adjacent to the handle end. The bottom portion is positioned adjacent to the blades end. A handle is coupled to the handle end that extends outwardly from the shaft in a first direction. A trigger mechanism is coupled to the handle that engages the rod and rotates the rod within the shaft. A pair of blades is pivotably coupled to the rod, extending outwardly from the blades end in a second. A coupler pivotably couples the pair of blades together at the bottom portion of the rod.

14 Claims, 11 Drawing Sheets

WEED CLIPPING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to weeding devices and more particularly pertains to a new weeding device for removing weeds at the base of the plant while standing.

(2) Description of Related Art Including Information Disclosed Under 37 CFR 1.97 and 1.98

The prior art relates to weeding devices. Some weeding devices are mechanical. For example, the prior art discloses tools such as pruners, shovels, hoes, and trowels to cut or dig weeds out of the dirt. Those devices that cut weeds typically require the user to kneel or sit down next to the weed to clip the stem of the weed near to the ground. There are also claw-style weeding tools that a user can use while standing next to the weed. These devices typically require the user to exert pressure downward as they push the claw-style weeding tool into the dirt around the weed. The claw-style weeding tool can then grab the weed using the claws and the user can lift the tool to pull the weed from the ground. However, there is a need in the art for a cutting tool that can be used to trim weeds at the base of the plant near the ground while the user is standing.

BRIEF SUMMARY OF THE INVENTION

An embodiment of the disclosure meets the needs presented above by generally comprising a shaft having a handle end, a blades end, and a peripheral wall extending therebetween to define an interior space. A rod is rotatably coupled to the shaft and is positioned within the interior space. The rod has a top portion, a bottom portion, and a middle portion extending therebetween. The top portion is positioned adjacent to the handle end. The bottom portion is positioned adjacent to the blades end. A length of the rod exceeds the length of the shaft such that the bottom portion extends outwardly from the shaft beyond the blades end when the top portion is enclosed within the shaft. A handle is coupled to the handle end. The handle extends outwardly from the shaft in a first direction. A trigger mechanism is coupled to the handle that engages the rod whereby the trigger mechanism rotates the rod within the shaft. A pair of blades is pivotably coupled to the rod. Each of the pair of blades extends outwardly from the blades end in a second direction that is opposite the first direction. The pair of blades is configured to clip weeds proximate to a ground surface while a user is standing on the ground surface. A coupler pivotably couples the pair of blades together at the bottom portion of the rod. The coupler pivots each of the pair of blades inwardly toward the other and outwardly from the other when the trigger mechanism rotates the rod within the shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
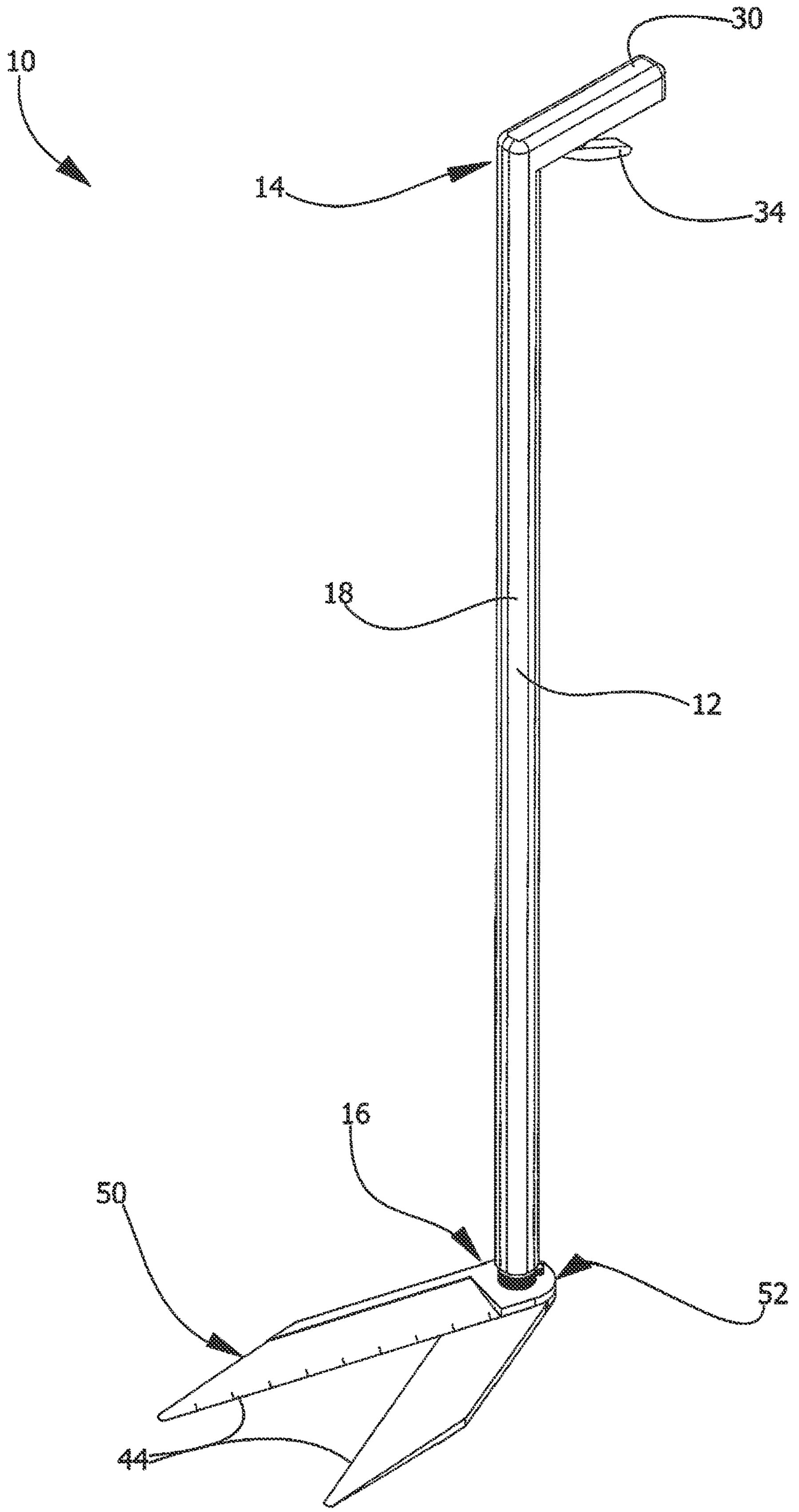
FIG. 1 is a top front isometric view of a weed clipping device according to an embodiment of the disclosure.
Figure 2:
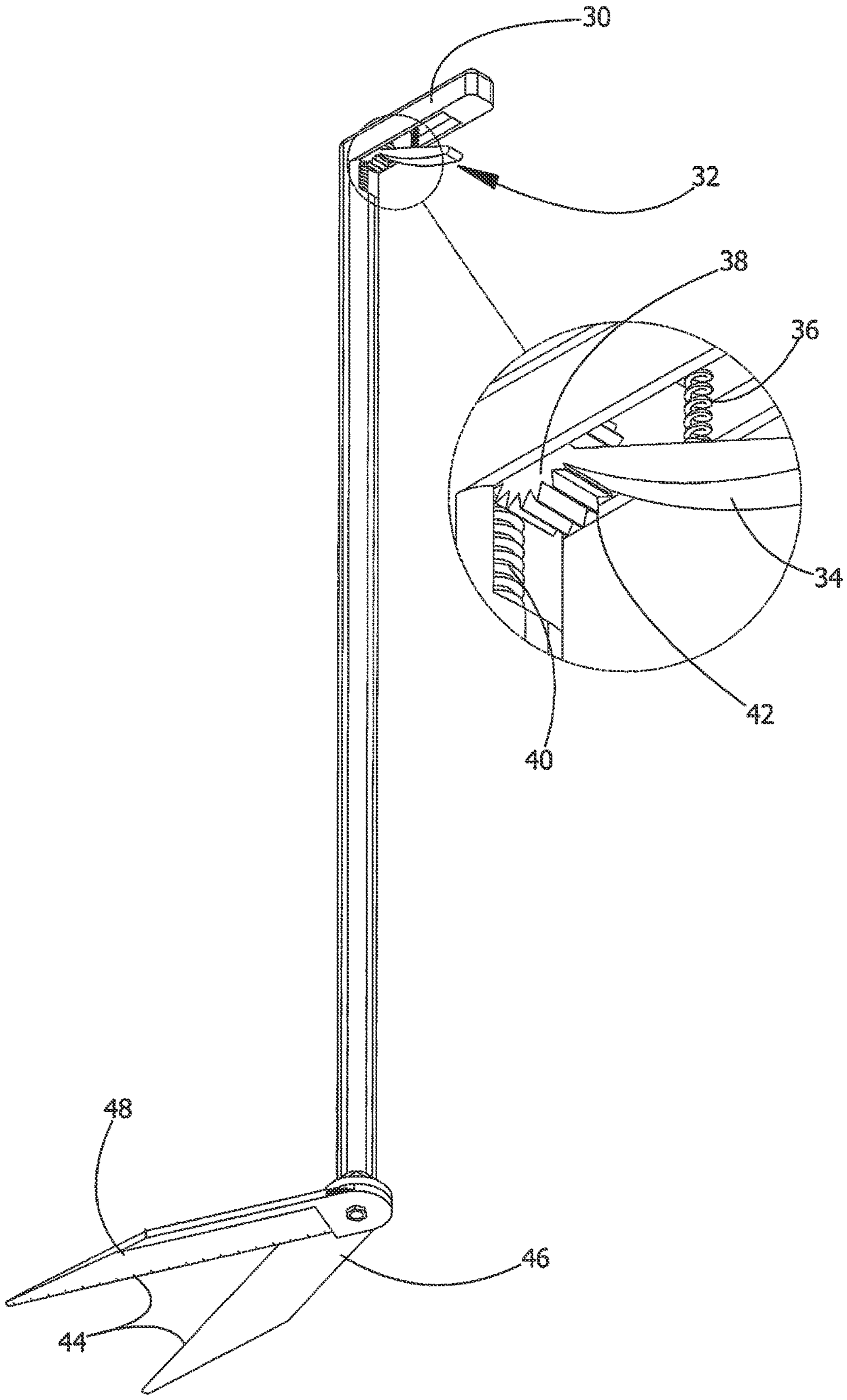
FIG. 2 is a bottom rear isometric view of an embodiment of the disclosure.
Figure 3:
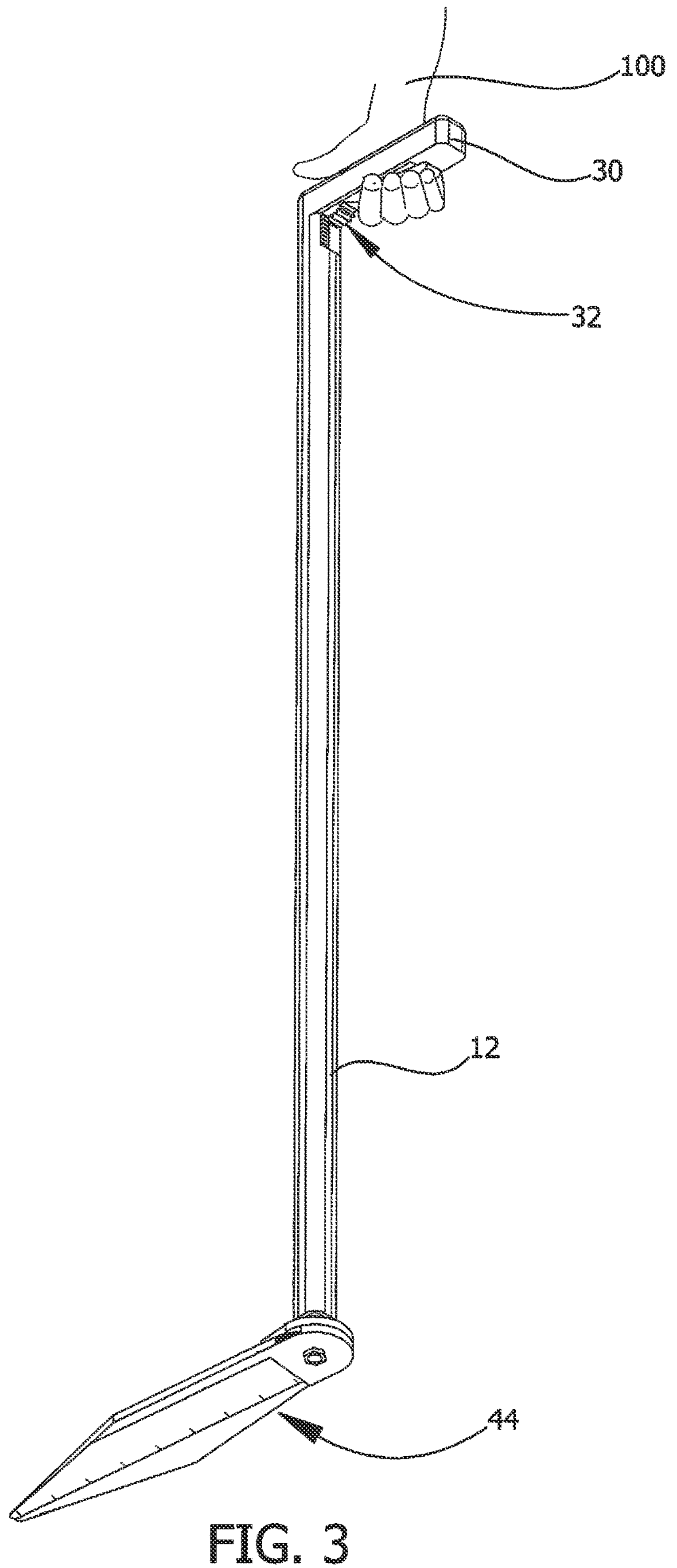
FIG. 3 is a bottom rear isometric view of an embodiment of the disclosure.
Figure 4:
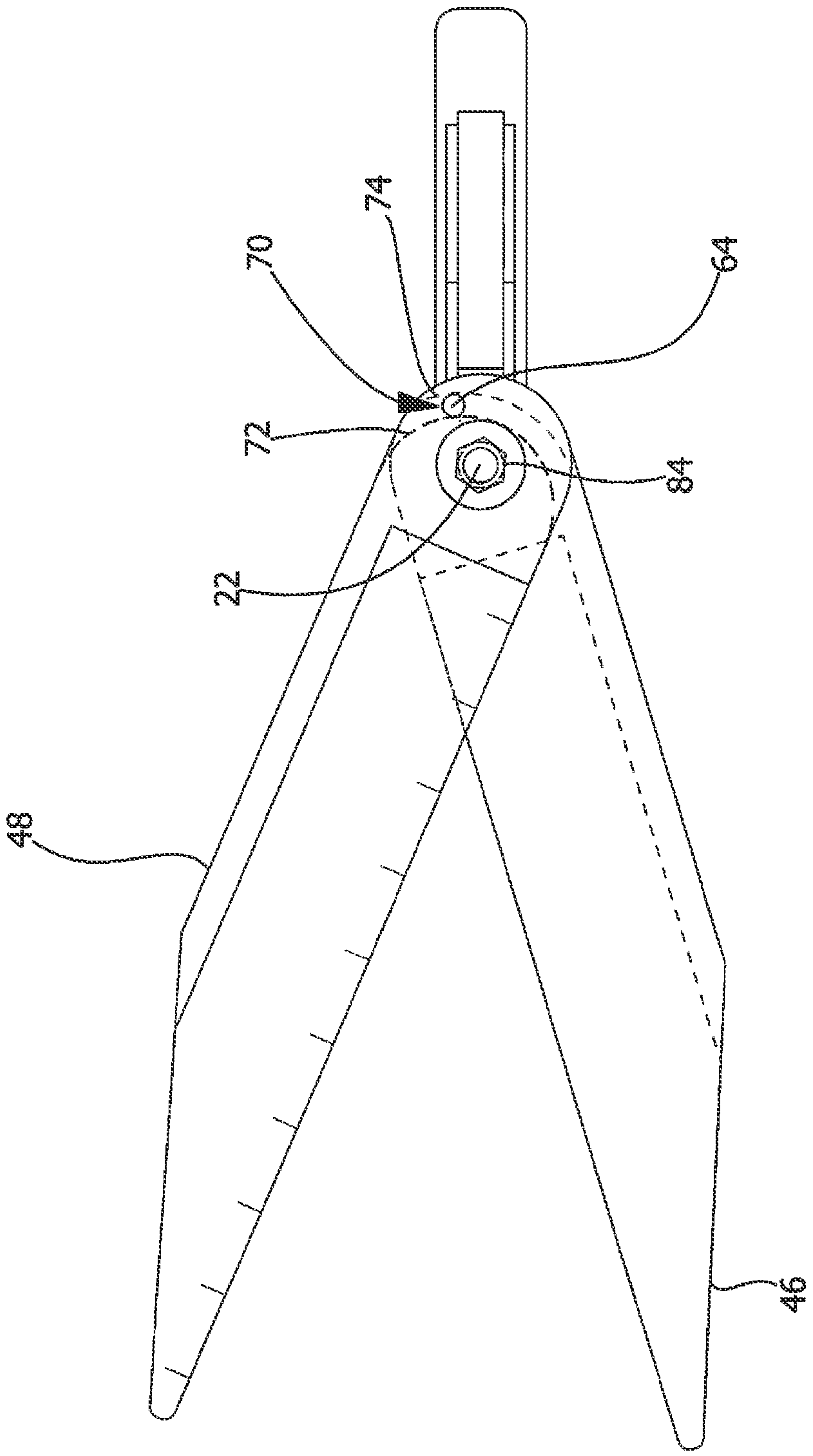
FIG. 4 is a bottom view of an embodiment of the disclosure.
Figure 5:
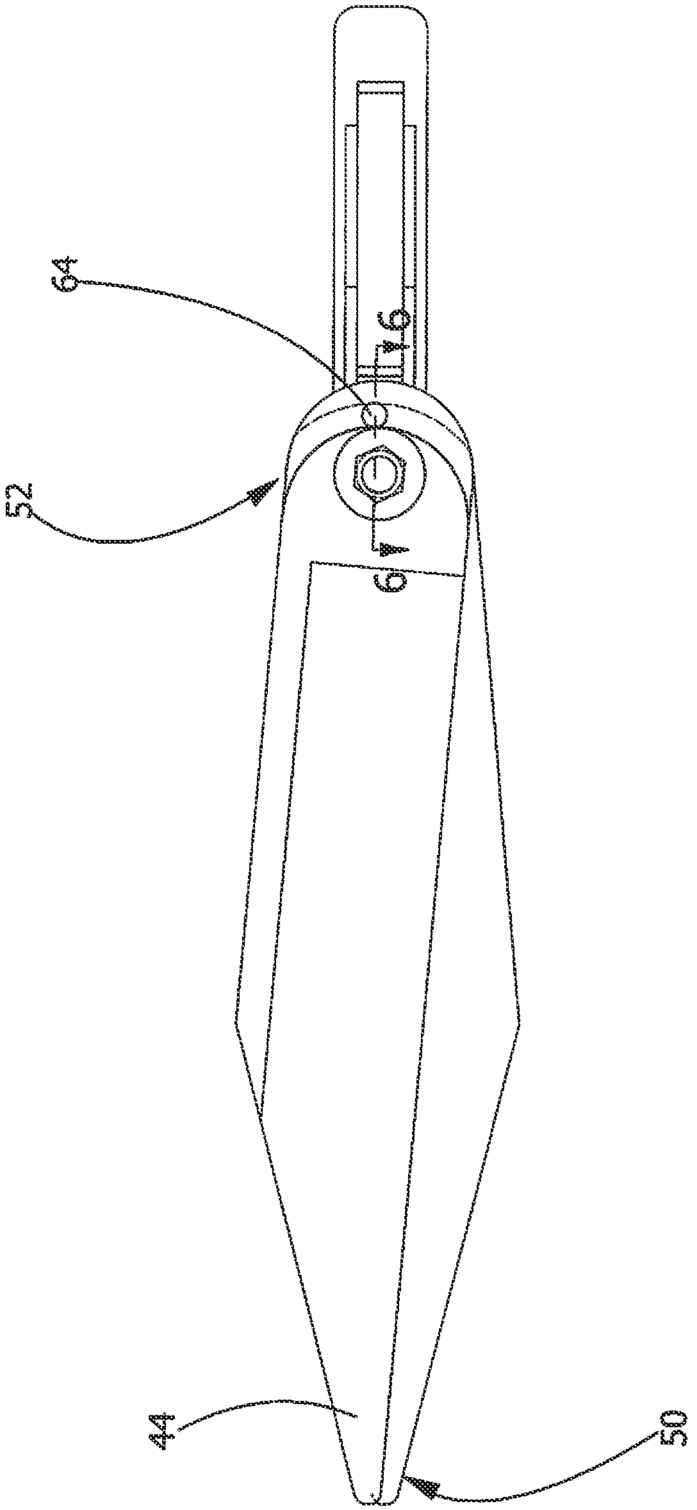
FIG. 5 is a bottom view of an embodiment of the disclosure.
Figure 6:
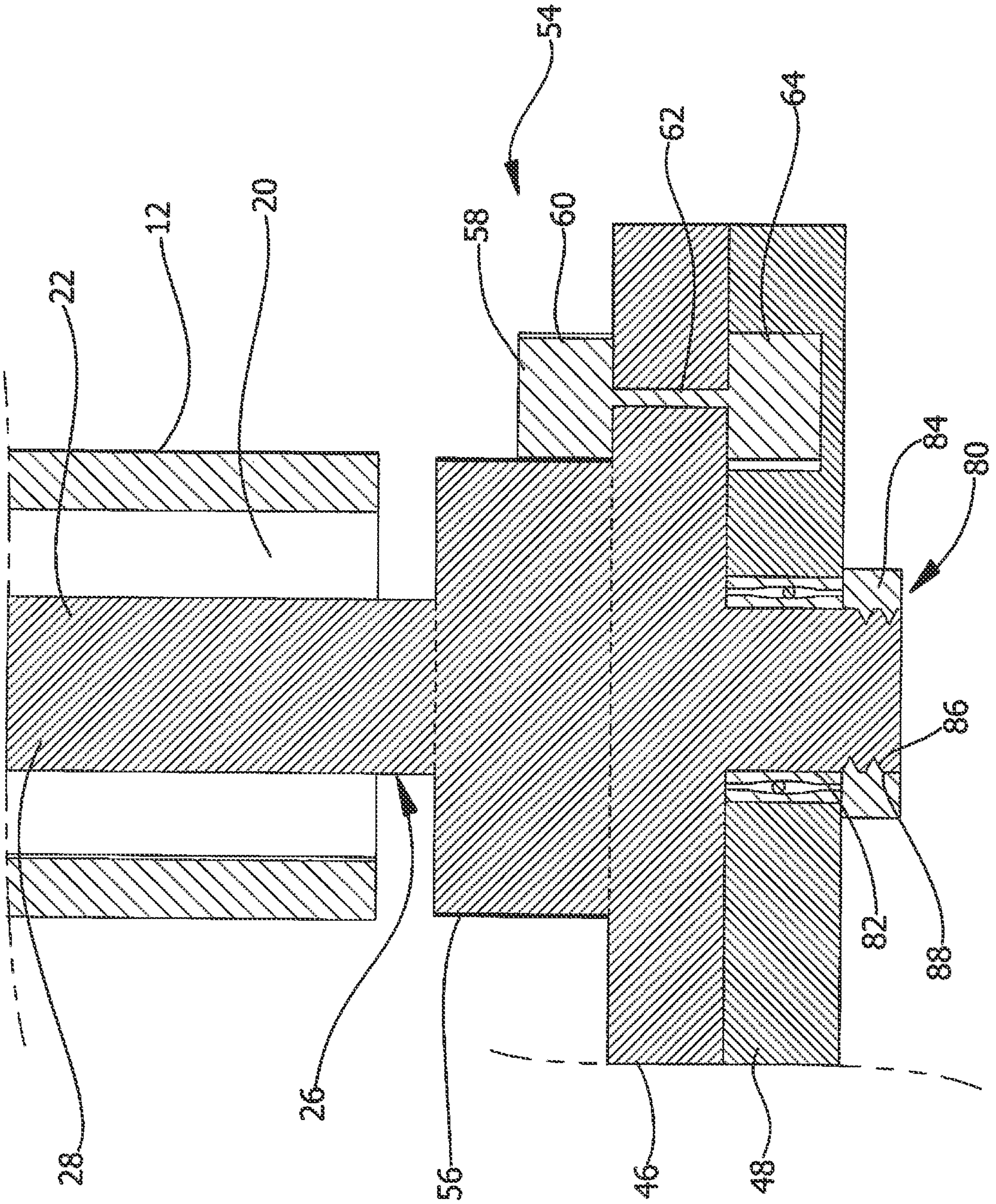
FIG. 6 is a cross-sectional view of an embodiment of the disclosure.

With reference now to the drawings, and in particular to FIGS. 1 through 11 thereof, a new weeding device embodying the principles and concepts of an embodiment of the disclosure and generally designated by the reference numeral 10 will be described.

As best illustrated in FIGS. 1 through 11, the weed clipping device 10 generally comprises a shaft 12 having a handle end 14, a blades end 16, and a peripheral wall 18 extending therebetween to define an interior space 20.

A rod 22 is rotatably coupled to the shaft 12. The rod 22 is positioned within the interior space 20. The rod 22 has a top portion 24, a bottom portion 26, and a middle portion 28 extending therebetween. The top portion 24 is generally positioned adjacent to the handle end 14 and the bottom portion 26 is generally positioned adjacent to the blades end 16. In embodiments, a length of the rod 22 exceeds the length of the shaft 12 such that the bottom portion 26 extends outwardly from the shaft 12 beyond the blades end 16 when the top portion 24 is enclosed within the shaft 12.

A handle 30 is coupled to the handle end 14. The handle 30 extends outwardly from the shaft 12 in a first direction, which may be generally perpendicular to the shaft 12. The handle 30 is configured for being gripped by a user 100.

A trigger mechanism 32 is coupled to the handle 30. The trigger mechanism 32 engages the rod 22 whereby the trigger mechanism 32 rotates the rod 22 within the shaft 12. The trigger mechanism 32 generally comprises a trigger 34 that is pivotably coupled to the handle 30. The trigger 34 pivots upwardly toward the handle 30 and downwardly from the handle 30. A spring 36 is attached to and extends between the handle 30 and the trigger 34. The spring 36 compresses when the trigger 34 pivots inwardly toward the handle 30. The spring 36 expands when the trigger 34 pivots outwardly from the handle 30. The spring 36 may bias the trigger 34 outwardly from the handle 30.

A trigger gear 38 is coupled to the trigger 34 adjacent to the shaft 12. The trigger gear 38 contacts the top portion 24 of the rod 33. The trigger gear 38 pivots downwardly when the trigger 34 pivots upwardly toward the handle 30. The trigger gear 38 pivots upwardly when the trigger 34 pivots downwardly from the handle 30.

The top portion 24 includes a top threading 40 and the trigger gear 38 includes a trigger threading 42. The top threading 40 is complementary to the trigger threading 42 such that the rod 22 rotates when the trigger gear 38 pivots. For example, when the trigger gear 38 pivots downwardly from the trigger 34 pivoting upwardly toward the handle 30, the rod 22 may rotate in a clockwise direction. In such embodiments, the rod 22 may rotate in a counterclockwise direction when the trigger gear 38 pivots upwardly from the trigger 34 pivoting downwardly from the handle 30. In alternative embodiments, the rod 22 may rotate in a counterclockwise direction when the trigger gear 38 pivots downwardly from the trigger 34 pivoting upwardly toward the handle 30, and the rod 22 may rotate in a clockwise direction when the trigger gear 38 pivots upwardly from the trigger 34 pivoting downwardly from the handle 30.

A pair of blades 44 is pivotably coupled to the rod 22. Each of the pair of blades 44 extends outwardly from the blades end 16 in a second direction. The second direction is generally opposite the first direction, such that the pair of blades 44 extends from the opposite side of the rod 22 and the shaft 12 from the handle 30. An example embodiment showing this spatial relationship is provided in FIG. 1. Each of the pair of blades 44 pivots inwardly toward the other when the rod 22 rotates from the trigger 34 pivoting upward toward the handle 30. The pair of blades 44 is thereby configured to clip weeds 102 proximate to a ground surface 104 while a user 100 is standing on the ground surface 104. The weed clipping device 10 thus facilitates the user 100 in clipping the weeds 102 without needing to sit or kneel on the ground surface 104 and without needing to dig into the ground surface 104. The user 100 can stand comfortably above the weeds 102 while removing growth from the base of the plant. The pair of blades 44 may also be configured to clip grass and other plant growth.

The pair of blades 44 generally comprises a first blade 46 that is attached to the bottom portion 26 of the rod 22. A second blade 48 is pivotably coupled to the bottom portion 26. The second blade 48 is generally positioned beneath the first blade 46. The first blade 46 pivots in a same direction as the rod 22 when the trigger mechanism 32 rotates the rod 22 within the shaft 12. The second blade 48 pivots in an opposite direction as the rod 22 when the trigger mechanism 32 rotates the rod 22 within the shaft 12. Each of the pair of blades 44 generally has a pointed end portion 50 and a rounded end portion 52. In embodiments, each of the pair of blades 44 generally pivots about the rounded end portion 52.

A coupler 54 pivotably couples the pair of blades 44 to the bottom portion 26 of the rod 22. The coupler 54 pivots each of the pair of blades 44 inwardly toward the other and outwardly from the other when the trigger mechanism 32 rotates the rod 22 within the shaft 12.

The coupler 54 may comprise a first gear 56 that is attached to the first blade 46. The first gear 56 extends upwardly from the first blade 46 toward the bottom portion 26. A second gear 58 is also attached to the first blade 46. The second gear 58 extends through the first blade 46. The second gear 58 has a first portion 60, a second portion 62, and a third portion 64. The first portion 60 is coupled to the third portion 64 by the second portion 62. The first portion 60 extends upwardly from the first blade 46 whereby the first portion 60 contacts the first gear 56. The third portion 64 extends downwardly from the first blade 46. The second portion 62 extends through the first blade 46 between the first portion 60 and the third portion 64.

The first gear 56 has a first gear threading 66 and the first portion 60 has an upper gear threading 68. The first gear threading 66 is complementary to the upper gear threading 68 whereby the first gear 56 engages the first portion 60 to move the second gear 58 along with the first blade 46 in the same direction as the rod 22 moves within the shaft 12.

A channel 70 extends across the second blade 48 proximate to the rod 22. In the embodiment shown in FIG. 7, the coupler 54 is generally positioned proximate to the rounded end portion 52 of each of the pair of blades 44. For example, the channel 70 may extend across the second blade 48 along the rounded end portion 52. The channel 70 is configured to receive the third portion 64 of the second gear 58 when the second blade 46 is coupled to the rod 22. The channel 70 has a first wall 72 and a second wall 74.

The first wall 72 has a wall threading 76. The third portion 64 has a second gear threading 78. The second gear threading 78 is complementary to the wall threading 76 such that the third portion 64 of the second gear 58 engages the wall threading 76 of the first wall 72 to move the second blade 48 in the opposite direction as the second gear 58 moves along with the first blade 46 in the same direction.

Figure 7:
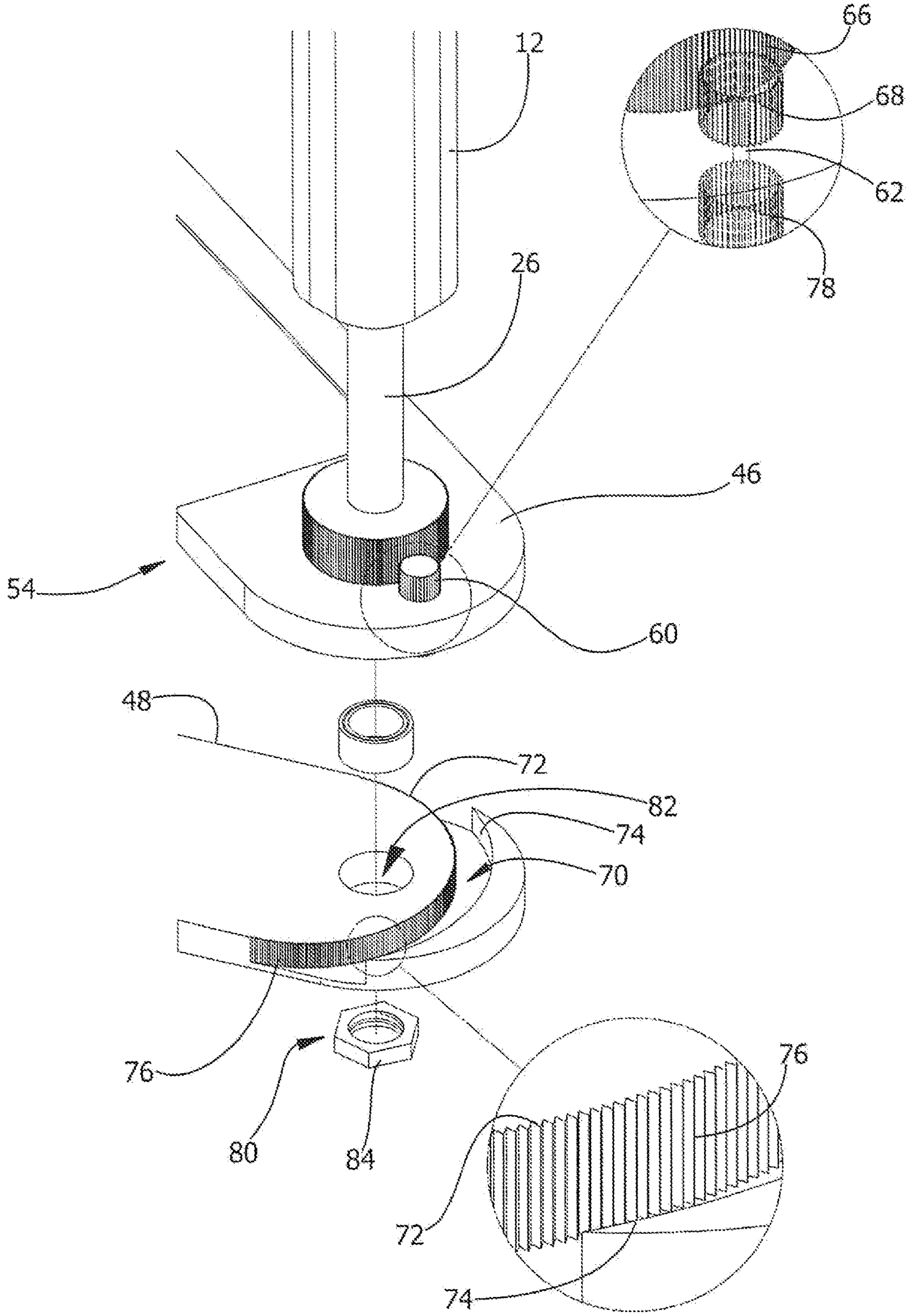
FIG. 7 is a detail exploded view of an embodiment of the disclosure.
Figure 8:
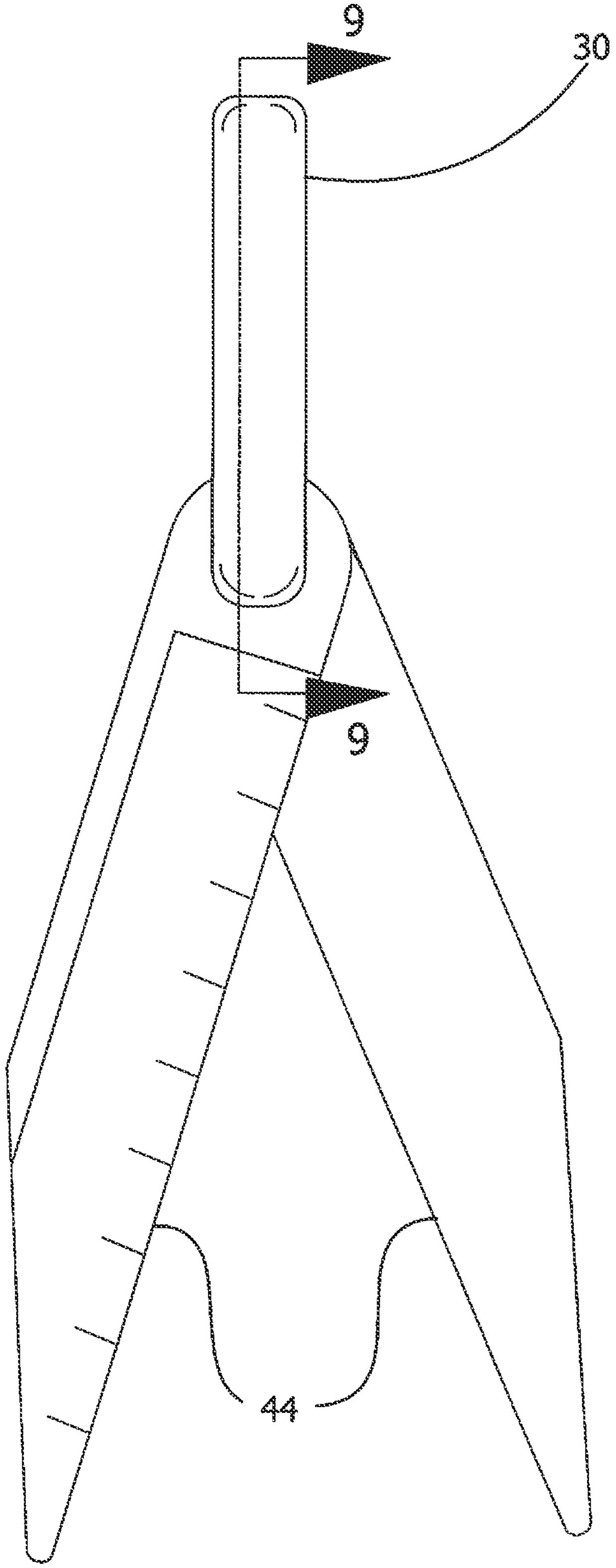
FIG. 8 is a top view of an embodiment of the disclosure.
Figure 9:
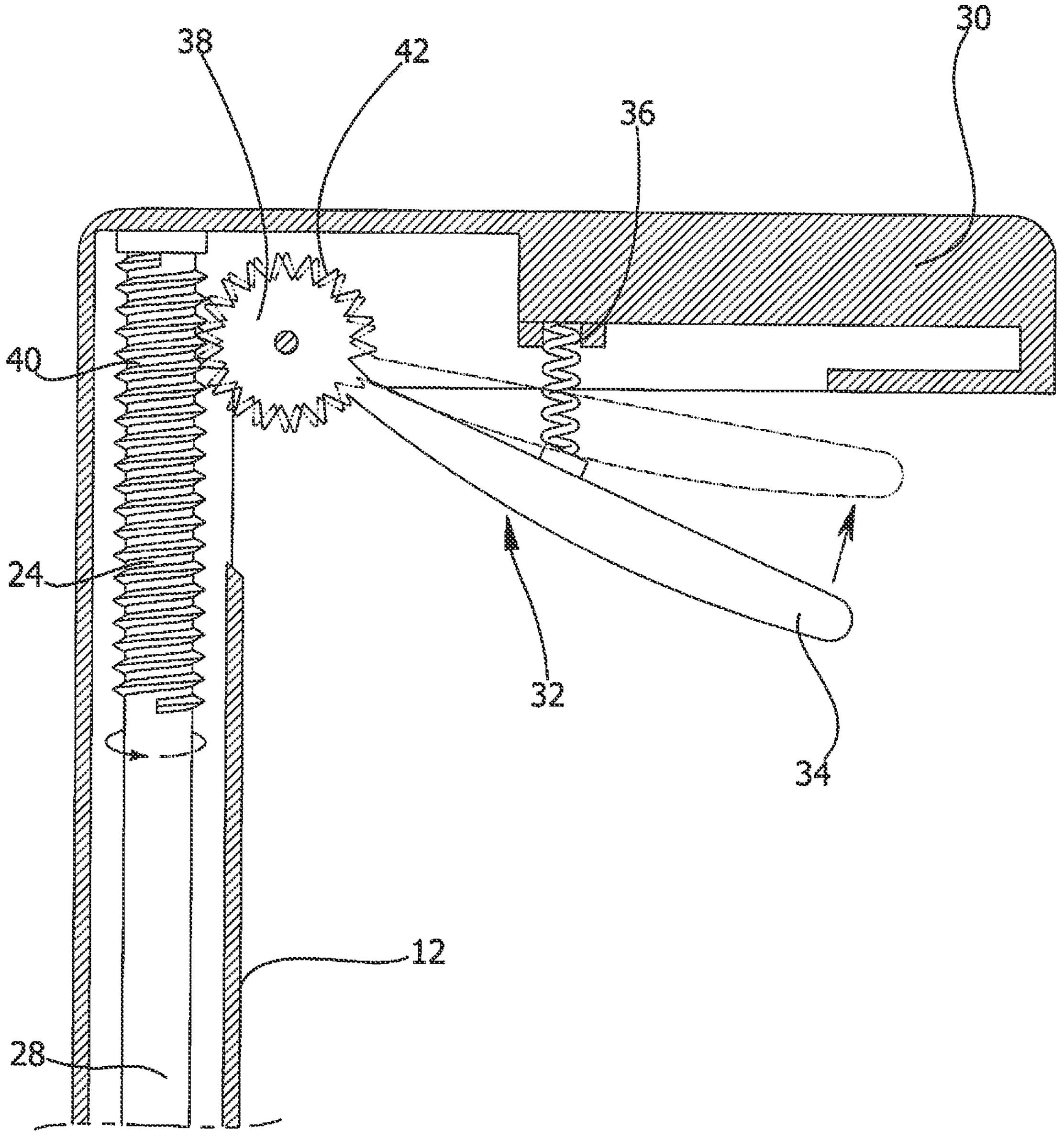
FIG. 9 is a cross-sectional view of an embodiment of the disclosure.

A retainer 80 couples the second blade 48 to the rod 22. The retainer 80 generally comprises the bottom portion 26 extending through the first blade 46 into an aperture 82 within the second blade 48. The aperture 82 is generally positioned proximate to the channel 70, as shown in FIG. 7. A fastener 84 secures the second blade 48 to the bottom portion 26. For example, the fastener 84 may comprise a nut, such as a hex nut. The bottom portion 26 has a bottom threading 86 and the fastener 84 has a fastener threading 88.

The bottom threading 86 is complementary to the fastener threading 88 such that the fastener 84 is threadably coupled to the bottom portion 26.

In use, the user 100 may stand on the ground surface 1043 near the weeds 102 or other plant growth the user 100 wants to trim. The user 100 can position the pair of blades 44 around the weeds 102 and push the trigger 34 upwardly toward the handle 30 to rotate the rod 22 within the shaft 12. As the rod 22 rotates, the coupler 54 pivots the pair of blades 44 inwardly toward each other to cut the weeds 102. As the user 100 releases the trigger 34, the trigger gear 38 pivots the rod 22 whereby the coupler 54 pivots the pair of blades 44 outwardly from each other.

Figure 10:
FIG. 10 is an in-use view of an embodiment of the disclosure.
Figure 11:
FIG. 11 is an in-use view of an embodiment of the disclosure.

The shaft 12 may have a length between 2.5 feet and 3.5 feet so that the pair of blades 44 reaches the ground surface 104 when the user 100 is standing next to the weeds 102, as shown in FIGS. 10 and 11. The shaft 12 may comprise aluminum and the handle 30 may comprise plastic so that the weed clipping device 10 is easy for the user 100 to carry and manipulate. Other lightweight, durable materials may also be used. The pair of blades 44 may comprise metal materials, for example so that the pair of blades 44 can be sharpened by the user as needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A weed clipping device comprising:

a shaft having a handle end, a blades end, and a peripheral wall extending therebetween to define an interior space;

a rod being rotatably coupled to the shaft, the rod being positioned within the interior space, the rod having a top portion, a bottom portion, and a middle portion extending therebetween, the top portion being positioned adjacent to the handle end, the bottom portion being positioned adjacent to the blades end, a length of the rod exceeding a length of the shaft such that the bottom portion extends outwardly from the shaft beyond the blades end when the top portion is enclosed within the shaft;

a handle being coupled to the handle end, the handle extending outwardly from the shaft in a first direction;

a trigger mechanism being coupled to the handle, the trigger mechanism engaging the rod whereby the trigger mechanism rotates the rod within the shaft;

a pair of blades being pivotably coupled to the rod, each of the pair of blades extending outwardly from the blades end in a second direction, the second direction being opposite the first direction, the pair of blades being configured to clip weeds proximate to a ground surface while a user is standing on the ground surface;

a coupler pivotably coupling the pair of blades to the bottom portion of the rod, the coupler pivoting each of the pair of blades inwardly toward the other and outwardly from the other when the trigger mechanism rotates the rod within the shaft;

the pair of blades further comprising:

a first blade being attached to the bottom portion;

a second blade being pivotably coupled to the bottom portion, the second blade being positioned beneath the first blade; and wherein the first blade pivots in a same direction as the rod when the trigger mechanism rotates the rod within the shaft, and wherein the second blade pivots in an opposite direction as the rod when the trigger mechanism rotates the rod within the shaft; and the coupler further comprising:

a first gear being attached to the first blade, the first gear extending upwardly from the first blade toward the bottom portion;

a second gear being attached to the first blade, the second gear extending through the first blade, the second gear having a first portion, a second portion, and a third portion, the first portion being coupled to the third portion by the second portion, the first portion extending upwardly from the first blade whereby the first portion contacts the first gear, the third portion extending downwardly from the first blade;

the first gear having a first gear threading and the first portion having an upper gear threading, the first gear threading being complementary to the upper gear threading whereby the first gear engages the first portion to move the second gear along with the first blade in the same direction;

a channel extending across the second blade proximate to the rod, the channel being configured to receive the third portion of the second gear when the second blade is coupled to the rod, the channel having a first wall and a second wall, the first wall having a wall threading; and the third portion having a second gear threading, the second gear threading being complementary to the wall threading such that the third portion of the second gear engages the first wall to move the second blade in the opposite direction as the second gear moves along with the first blade in the same direction.

2. The weed clipping device of claim 1, wherein the length of the shaft is between 2.5 feet and 3.5 feet.

3. The weed clipping device of claim 1, the shaft further comprising aluminum.

4. The weed clipping device of claim 1, wherein the handle is configured for being gripped by a user.

5. The weed clipping device of claim 1, wherein the handle is perpendicular to the shaft.

6. The weed clipping device of claim 1, the handle further comprising plastic.

7. The weed clipping device of claim 1, the trigger mechanism further comprising:

a trigger being pivotably coupled to the handle, the trigger pivoting upwardly toward the handle and downwardly from the handle;

a spring being attached to and extending between the handle and the trigger, the spring compressing when the trigger pivots inwardly toward the handle, the spring expanding when the trigger pivots outwardly from the handle;

a trigger gear being coupled to the trigger adjacent to the shaft, the trigger gear contacting the top portion of the rod, the trigger gear pivoting downwardly when the trigger pivots upwardly toward the handle, the trigger gear pivoting upwardly when the trigger pivots downwardly from the handle; and the top portion including a top threading and the trigger gear including a trigger threading, the top threading being complementary to the trigger threading such that the rod rotates when the trigger gear pivots.

8. The weed clipping device of claim 7, wherein the spring biases the trigger outwardly from the handle.

9. The weed clipping device of claim 1, wherein each of the pair of blades pivots inwardly toward the other when the rod rotates from the trigger being pivoted upward toward the handle.

10. The weed clipping device of claim 9, each of the pair of blades further comprising a pointed end portion and a rounded end portion, each of the pair of blades pivoting about the rounded end portion.

11. The weed clipping device of claim 10, wherein the coupler is positioned proximate to the rounded end portion of each of the pair of blades.

12. The weed clipping device of claim 1, further comprising a retainer coupling the second blade to the rod.

13. The weed clipping device of claim 12, the retainer further comprising:

the bottom portion extending through the first blade into an aperture within the second blade, the aperture being positioned proximate to a channel;

a fastener securing the second blade to the bottom portion; and the bottom portion having a bottom threading, the fastener having a fastener threading, the bottom threading being complementary to the fastener threading such that the fastener is threadably coupled to the bottom portion.

14. A weed clipping device comprising:

a shaft having a handle end, a blades end, and a peripheral wall extending therebetween to define an interior space, the shaft having a length between 2.5 feet and 3.5 feet, the shaft being aluminum;

a rod being rotatably coupled to the shaft, the rod being positioned within the interior space, the rod having a top portion, a bottom portion, and a middle portion extending therebetween, the top portion being positioned adjacent to the handle end, the bottom portion being positioned adjacent to the blades end, a length of the rod exceeding the length of the shaft such that the bottom portion extends outwardly from the shaft beyond the blades end when the top portion is enclosed within the shaft;

a handle being coupled to the handle end, the handle extending outwardly from the shaft in a first direction, the handle being configured for being gripped by a user, the handle being perpendicular to the shaft, the handle being plastic;

a trigger mechanism being coupled to the handle, the trigger mechanism engaging the rod whereby the trigger mechanism rotates the rod within the shaft, the trigger mechanism comprising:

a trigger being pivotably coupled to the handle, the trigger pivoting upwardly toward the handle and downwardly from the handle;

a spring being attached to and extending between the handle and the trigger, the spring compressing when the trigger pivots inwardly toward the handle, the spring expanding when the trigger pivots outwardly from the handle, the spring biasing the trigger outwardly from the handle;

a trigger gear being coupled to the trigger adjacent to the shaft, the trigger gear contacting the top portion of the rod, the trigger gear pivoting downwardly when the trigger pivots upwardly toward the handle, the trigger gear pivoting upwardly when the trigger pivots downwardly from the handle;

the top portion including a top threading and the trigger gear including a trigger threading, the top threading being complementary to the trigger threading such that the rod rotates when the trigger gear pivots;

a pair of blades being pivotably coupled to the rod, each of the pair of blades extending outwardly from the blades end in a second direction, the second direction being opposite the first direction, the pair of blades being configured to clip weeds proximate to a ground surface while a user is standing on the ground surface, each of the pair of blades pivoting inwardly toward the other when the rod rotates from the trigger being pivoted upward toward the handle, the pair of blades comprising:

a first blade being attached to the bottom portion;

a second blade being pivotably coupled to the bottom portion, the second blade being positioned beneath the first blade;

wherein the first blade pivots in a same direction as the rod when the trigger mechanism rotates the rod within the shaft, and wherein the second blade pivots in an opposite direction as the rod when the trigger mechanism rotates the rod within the shaft;

each of the pair of blades having a pointed end portion and a rounded end portion, each of the pair of blades pivoting about the rounded end portion;

a coupler pivotably coupling the pair of blades to the bottom portion of the rod, the coupler pivoting each of the pair of blades inwardly toward the other and outwardly from the other when the trigger mechanism rotates the rod within the shaft, the coupler comprising:

a first gear being attached to the first blade, the first gear extending upwardly from the first blade toward the bottom portion;

a second gear being attached to the first blade, the second gear extending through the first blade, the second gear having a first portion, a second portion, and a third portion, the first portion being coupled to the third portion by the second portion, the first portion extending upwardly from the first blade whereby the first portion contacts the first gear, the third portion extending downwardly from the first blade;

the first gear having a first gear threading and the first portion having an upper gear threading, the first gear threading being complementary to the upper gear threading whereby the first gear engages the first portion to move the second gear along with the first blade in the same direction;

a channel extending across the second blade proximate to the rod, the channel being configured to receive the third portion of the second gear when the second blade is coupled to the rod, the channel having a first wall and a second wall, the first wall having a wall threading;

the third portion having a second gear threading, the second gear threading being complementary to the wall threading such that the third portion of the second gear engages the wall threading of the first wall to move the second blade in the opposite direction as the second gear moves along with the first blade in the same direction;

the coupler being positioned proximate to the rounded end portion of each of the pair of blades;

a retainer coupling the second blade to the rod, the retainer comprising:

the bottom portion extending through the first blade into an aperture within the second blade, the aperture being positioned proximate to the channel;

a fastener securing the second blade to the bottom portion; and the bottom portion having a bottom threading, the fastener having a fastener threading, the bottom threading being complementary to the fastener threading such that the fastener is threadably coupled to the bottom portion.

* * * * *